(12) United States Patent
Zaifman et al.

(10) Patent No.: US 9,325,639 B2
(45) Date of Patent: Apr. 26, 2016

(54) HIERARCHICAL CACHING SYSTEM FOR LOSSLESS NETWORK PACKET CAPTURE APPLICATIONS

(71) Applicant: AT&T INTELLECTUAL PROPERTY I, L.P., Atlanta, GA (US)

(72) Inventors: Arthur L. Zaifman, Millburn, NJ (US); John M. Mocenigo, Califon, NJ (US); Tzvi Chumash, Matawan, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 190 days.

(21) Appl. No.: 14/109,438

(22) Filed: Dec. 17, 2013

(65) Prior Publication Data

US 2015/0172224 A1    Jun. 18, 2015

(51) Int. Cl.
| | | |
|---|---|---|
| H04B 7/204 | (2006.01) | |
| H04L 12/939 | (2013.01) | |
| H04L 29/08 | (2006.01) | |
| H04L 29/06 | (2006.01) | |

(52) U.S. Cl.
CPC ............ *H04L 49/552* (2013.01); *H04L 49/555* (2013.01); *H04L 67/2842* (2013.01); *H04L 63/0272* (2013.01)

(58) Field of Classification Search
CPC ..................................................... H04L 49/552
USPC .......................... 370/325–339; 709/224–236
See application file for complete search history.

(56) References Cited

U.S. PATENT DOCUMENTS

| | | |
|---|---|---|
| 5,838,663 A | 11/1998 | Elwalid et al. |
| 5,983,278 A | 11/1999 | Chong et al. |
| 6,181,708 B1 | 1/2001 | Quackenbush et al. |
| 6,192,049 B1 | 2/2001 | Sohraby |
| 6,434,608 B1 | 8/2002 | Desai |
| 6,499,088 B1 | 12/2002 | Wexler et al. |

(Continued)

FOREIGN PATENT DOCUMENTS

| | | |
|---|---|---|
| WO | 2007018599 | 2/2007 |
| WO | 2011103828 | 9/2011 |

OTHER PUBLICATIONS

Berg et al. "A statistical multiprocessor cache model." Performance Analysis of Systems and Software, 2006 IEEE International Symposium on. IEEE, 2006. https://www.it.uu.se/research/group/uart/pub/berg_2006_mar/berg_2006_mar.pdf.

(Continued)

*Primary Examiner* — Iqbal Zaidi
(74) *Attorney, Agent, or Firm* — Akerman LLP; Michael K. Dixon; Mammen (Roy) P. Zachariah, Jr.

(57) ABSTRACT

A system for providing lossless hierarchical caching is disclosed. The system may process, in a first thread, a first set of a plurality of packets in a first cache. Then, the system may determine if a condition associated with processing the first set of the packets indicates that there is potential for packet loss. If the system determines that there is potential for packet loss, a copy of a portion of the first set of the packets may be transmitted to a second cache. The system may process, in a second thread, the copy of the portion of the first set of the packets in the second cache. Additionally, the system may transmit a subset of packets from the first set of packets to a reorder queue for reordering the subset of packets if the subset of packets contain an identifier associated with the reorder queue.

20 Claims, 13 Drawing Sheets

(56) References Cited

U.S. PATENT DOCUMENTS

| | | | |
|---|---|---|---|
| 6,505,241 | B2 | 1/2003 | Pitts |
| 6,567,415 | B1 | 5/2003 | Elwalid et al. |
| 6,859,435 | B1 | 2/2005 | Lee et al. |
| 6,970,479 | B2 | 11/2005 | Abrahamsson et al. |
| 7,187,804 | B2 | 3/2007 | Zhao et al. |
| 7,506,065 | B2 | 3/2009 | Lavigne et al. |
| 7,684,347 | B2 | 3/2010 | Merkey et al. |
| 7,872,973 | B2 | 1/2011 | Sterne et al. |
| 8,208,380 | B1 | 6/2012 | Nachum et al. |
| 8,351,333 | B2 | 1/2013 | Rao et al. |
| 2003/0152096 | A1 | 8/2003 | Chapman |
| 2005/0220091 | A1 | 10/2005 | Lavigne et al. |
| 2008/0046616 | A1 | 2/2008 | Verzunov et al. |
| 2011/0142039 | A1 | 6/2011 | Jung |
| 2013/0051235 | A1 | 2/2013 | Song et al. |
| 2013/0148530 | A1* | 6/2013 | Di Girolamo ....... H04L 12/2602 370/252 |
| 2013/0205038 | A1 | 8/2013 | Decusatis et al. |
| 2013/0250762 | A1 | 9/2013 | Assarpour |
| 2013/0275586 | A1 | 10/2013 | Luna et al. |
| 2014/0355613 | A1* | 12/2014 | Pope ....................... H04L 49/20 370/392 |

OTHER PUBLICATIONS

Kaxiras et al. "Cache decay: exploiting generational behavior to reduce cache leakage power." Computer Architecture, 2001. Proceedings. 28th Annual International Symposium on. IEEE, 2001. http://www.researchgate.net/publication.

Enright Jerger et al., "Virtual tree coherence: Leveraging regions and in-network multicast trees for scalable cache coherence." Microarchitecture, 2008. MICRO-41. 2008 41st IEEE/ACM International Symposium on. IEEE, 2008. http://projects.csail.mit.edu/wiki/pub/LSPgroup/PublicationList/vtc.pdf.

Muntz et al., "Multi-level caching in distributed file systems." USENIX Association Winter 1992 Conference Proceedings. 1992. http://141.212.112.111/techreports/reports/citi-tr-91-3.pd.

Ari et al., "SANBoost: automated SAN-level caching in storage area network." Autonomic Computing, 2004. Proceedings. International Conference on. IEEE, 2004. http://ssrc.cse.ucsc.edu/Papers/ari-icac04.pdf.

Wilson Jr., "Hierarchical cache/bus architecture for shared memory multiprocessors." Proceedings of the 14th annual international symposium on Computer architecture. ACM, 1987. http://pdf.aminer.org/000/419 /623/hierarchical_cache_bus_architecture_for_shared_memory_multiprocessors.pdf.

* cited by examiner

HIERARCHICAL CACHING SYSTEM FOR LOSSLESS NETWORK PACKET CAPTURE APPLICATIONS

FIELD OF THE INVENTION

The present application relates to computer caching, packet capture, and data loss prevention technologies, and more particularly, to a hierarchical caching system for lossless network packet capture applications.

BACKGROUND

Currently, network packet capture technologies are regularly utilized to access data flowing across one or more networks. Such network packet capture technologies may include, but are not limited to, network taps, optical splitters, telephone taps, virtual taps, network monitoring devices, and other network packet capture devices. Network packet capture technologies may be utilized for a variety of purposes, such as, but not limited to, warranted law enforcement taps, network troubleshooting, packet sniffing, and network intrusion detection. In order to capture packets, network packet capture devices may be placed on a network link between two devices, such as on a network link between two routers in a network. As an example, an optical splitter, which may be passive packet capture device, may be placed in a fiber line between a first and a second router, and may be utilized to split an optical signal that is sent over the fiber line by the first router and intended for the second router into two identical data streams. One of the streams may be forwarded to the second router as was intended, however, the second stream may be transmitted to a monitoring device that can process and analyze the data in the optical signal. Based on the analysis of the data, the monitoring device may be utilized to identify faults in a network, assist in troubleshooting of the network, assist law enforcement in identifying packets sent by senders that are subject to a warrant, calculate network performance metrics and statistics, and provide a variety of other features and functions.

Network packet capture for law enforcement purposes typically requires that there be no packet loss for communications that are monitored. However, traditional network packet capture software typically does not participate in protocol exchanges that are being recorded, and, instead, the network packet capture software typically acts as an observer for the communications that the software is monitoring. As a result, if a packet is lost because of temporary spikes in flow rate or volume, or for other reasons, the network packet capture software cannot inform the sender of the packet to resend the lost packet or to use flow-control or back pressure techniques to slow the transmission rate for sending the packets. Often times, a single packet in a communication stream may hold the critical information that law enforcement may use in determining that a criminal activity is occurring or will occur in the future. Currently, techniques for achieving lossless packet capture often require the use of extensive additional hardware resources to compensate for inefficient non-scalable software. As an example, active packet capture devices may be utilized, which include special purpose hardware included within the network element itself. Such active packet capture devices may be programmed to direct certain packets that meet certain criterion, such as criterion specified in a law enforcement warrant, to a storage area. While such technologies are often useful in reducing packet loss, they often require the expenditure of significant amounts of resources, and require the use of a significant amount of legacy equipment.

SUMMARY

Systems and accompanying methods for providing hierarchical caching for lossless network packet capture applications are disclosed. Notably, the systems and methods may provide hierarchical caching for lossless network packet capture applications by moving packet data from one cache to another cache, such as a larger cache, based on one or more indicators that measure the potential for packet loss. In particular, the systems and methods may utilize a specialized packet capture device that resides within a server so as to capture packets intercepted from network taps, optical splitters, or other similar devices that are placed on various network links being monitored. Additionally, the systems and methods may utilize a first cache, such as a level one cache, that resides within the server and is controlled by the packet capture device to cache the captured packets. The packets that have been cached in the first cache may be processed in one or more processing threads by a processor of the server. In certain embodiments, the first cache may be configured to have a real-time service requirement, and the processor threads for the first cache may be dedicated processor threads. As the packets are being processed, if a condition arises that indicates that there is a potential for packet loss, then the processor may copy a portion of the unprocessed packets from the first cache to a second cache, such as a level two cache, of the server so as to prevent packet loss.

The processor may continue to process the packets in the first cache, and may also process the portion of the unprocessed packets copied into the second cache. In certain embodiments, the second cache may exist in the server's dynamic random-access memory and may be controlled by software. Additionally, the second cache may be configured to have a near real-time service requirement and packets in the second cache may be processed among non-dedicated threads and processes. The processor may continue to process the packets in the first cache and the packets in the second cache. As the packets are being processed, if a condition arises that indicates that there is a potential for packet loss, then the processor may copy a portion of the unprocessed packets from the second cache to a third cache. In certain embodiments, the third cache may reside outside the server and may serve the server, along with other servers. The third cache may offer a best-effort service and load-sharing among non-dedicated threads and processes across multiple servers. By moving packets to different caches based on the detection of potential loss of packets, the systems and methods may ensure that no packet loss occurs and that the integrity of the packets remain intact.

If a packet captured by the packet capture device includes or is associated with an identifier that matches certain selected criteria, such as a phone number or another similar identifier, the packet may be transmitted to a reorder queue for further processing. Since various packets matching the criteria may be processed in a different order in which they originally arrived in the system, the reorder queue may be utilized by the systems and methods to reorder the packets in the order in which they were initially received by the system. Additionally, as packets are moved from the first cache to the second cache, packets are moved from the second cache to the third cache, or a combination thereof, the system may transmit a notification indicating that an eviction delay for evicting packets from the reorder queue and that a service time for servicing the packets may increase. As a result, an agency or person that is requesting the packets that match the identifier will be on notice of delivery latencies and data quality based on the location of the packets in the cache hierarchy.

In one embodiment, a system for providing hierarchical caching for lossless network packet capture applications is disclosed. The system may include a first server that includes a memory that stores instructions and a processor that executes the instructions to perform various operations of the system. The first server may include a packet capture device that captures a plurality of packets, which may be managed in a queue by the packet capture device. Additionally, the first server may include a first cache controlled by the packet capture device and comprising a first capacity. The plurality of packets may be sent to the first cache from the packet capture device. The first server may also include a second cache comprising a second capacity. The system may process, in a first processor thread, a first set of the plurality of packets in the first cache. Then, the system may determine if a first condition associated with processing the first set of the plurality of packets in the first cache indicates that there is potential for packet loss. If the first condition indicates that there is potential for packet loss, a copy of a portion of the first set of the plurality of packets may be transmitted by the system to the second cache. The system may process, in a second processor thread, the copy of the portion of the first set of the plurality of packets in the second cache. The system may transmit a subset of packets from the first set of packets to a reorder queue if the subset of packets contain an identifier associated with the reorder queue. The subset of packets may be reordered in the reorder queue to conform to an order in which the subset of packets were initially received by the system.

In another embodiment, a method for providing hierarchical caching for lossless network packet capture applications is disclosed. The method may include utilizing a memory that stores instructions, and a processor of a first server that executes the instructions to perform the various functions of the method. Specifically, the method may include processing, in a first processor thread of the processor of the first server, a first set of a plurality of packets in a first cache that has a first capacity. The plurality of packets may be managed in a queue controlled by a packet capture device. Additionally, the method may include determining if a first condition associated with processing the first set of the plurality of packets in the first cache indicates that there is potential for packet loss. Furthermore, the method may include transmitting, if the first condition indicates that there is potential for packet loss, a copy of a portion of the first set of the plurality of packets to a second cache. The second cache may have a second capacity. The method may also include processing, in a second processor thread of the processor of the first server, the copy of the portion of the first set of the plurality of packets in the second cache. Finally, the method may include transmitting a subset of packets from the first set of packets to a reorder queue if the subset of packets contain an identifier associated with the reorder queue. The subset of packets may be reordered in the reorder queue to conform to an order in which the subset of packets were initially received.

According to yet another embodiment, a computer-readable device having instructions for providing hierarchical caching for lossless network packet capture applications is provided. The computer instructions, which when loaded and executed by a processor, may cause the processor to perform operations including: processing, in a first processor thread of the processor of the first server, a first set of a plurality of packets in a first cache, wherein the plurality of packets are managed in a queue controlled by a packet capture device, wherein the first cache has a first capacity; determining if a first condition associated with processing the first set of the plurality of packets in the first cache indicates that there is potential for packet loss; transmitting, if the first condition indicates that there is potential for packet loss, a copy of a portion of the first set of the plurality of packets to a second cache, wherein the second cache has a second capacity; processing, in a second processor thread of the processor of the first server, the copy of the portion of the first set of the plurality of packets in the second cache; and transmitting a subset of packets from the first set of packets to a reorder queue if the subset of packets contain an identifier associated with the reorder queue, wherein the subset of packets are reordered in the reorder queue to conform to an order in which the subset of packets were initially received.

These and other features of the systems and methods for providing hierarchical caching for lossless network packet capture applications are described in the following detailed description, drawings, and appended claims.

DETAILED DESCRIPTION OF THE INVENTION

Figure 1:
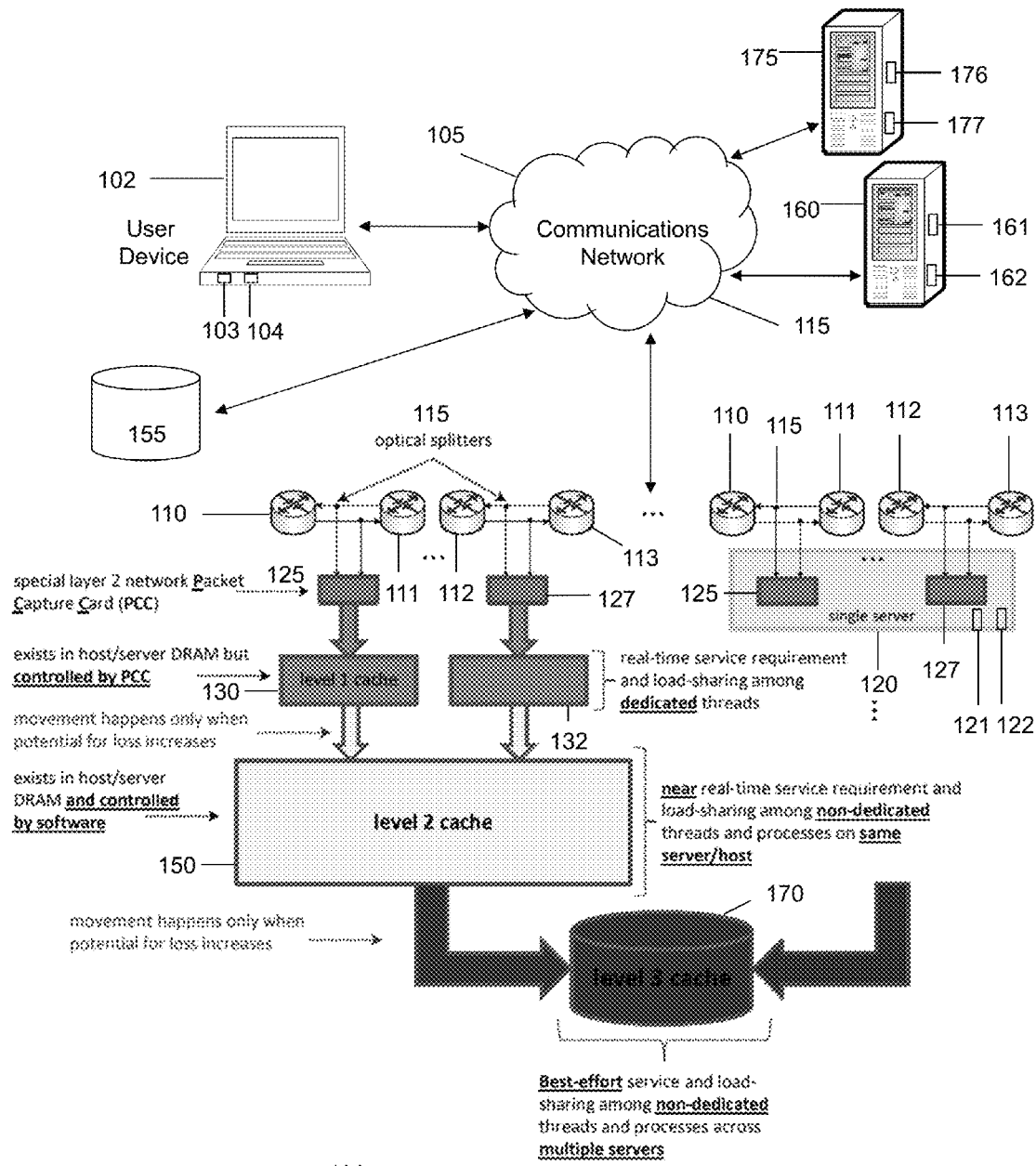
FIG. 1 is a schematic diagram of a system for providing hierarchical caching for lossless network packet capture applications according to an embodiment of the present disclosure.

A system 100 and accompanying methods for providing hierarchical caching for lossless network packet capture applications are disclosed. The system 100 and methods may reduce or eliminate data loss in network packet capture applications. In order to do so, the system 100 and methods may provide hierarchical caching for lossless network packet capture applications by moving packet data from one cache to another cache based on one or more indicators that measure the potential for packet loss. In particular, the system 100 and methods may utilize a packet capture device, such as packet capture device 125 or 127, that resides within a server 120 so as to capture packets intercepted from network taps, optical splitters 115, or other similar devices that are placed on various network links being monitored. Additionally, the system 100 and methods may utilize a first cache 130, 132, such as, but not limited to, a level one cache 130 or 132, that resides within the server 120 and is controlled by the packet capture device 125 or 127 to cache the captured packets. The packets that have been cached in the first cache 130, 132 may be processed in one or more processing threads by a processor 122 of the server 120. The first cache 130, 132 may be configured to have a real-time service requirement, and the processor threads for the first cache may be dedicated processor threads. As the packets are being processed by the system 100, if a condition arises that indicates that there is a potential for packet loss, then the processor 122 may copy a portion of the unprocessed packets from the first cache 130, 132 to a second cache 150, such as, but not limited to, a level two cache 150, of the server 120 so as to prevent packet loss.

The system 100 may continue to process the packets in the first cache 130, 132, and may also process the portion of the unprocessed packets copied into the second cache 150. The second cache 150 may exist in the server's 120 dynamic random-access memory and may be controlled by software residing in the server 120 or otherwise. Additionally, the second cache 150 may be configured to have a near real-time service requirement, and packets in the second cache 150 may be processed using non-dedicated threads and processes. The second cache 150 may be smaller, larger, or the same size as the first cache 130, 132. The processor 122 may continue to process the packets in the first and second caches 130, 132, 150. As the packets are being processed, if a condition arises that indicates that there is a potential for packet loss, then the processor 122 may copy a portion of unprocessed packets from the second cache 150 to a third cache 170. In certain embodiments, the third cache 170 may not reside within the server 120, and, instead, may be in a separate server or device, such as, but not limited to, a level three cache 170. The third cache 170 may offer a best-effort service and load-sharing among non-dedicated threads and processes across multiple servers. By moving packets to different caches based on the detection of potential loss of packets, the system 100 and methods may ensure that packet loss does not occur.

If a packet captured by the packet capture device 125, 127 includes or is associated with an identifier that matches certain selected criteria, such as a phone number, name, internet protocol address or other identifier, the packet may be transmitted to a reorder queue 220-223 for further processing. The reorder queue 220-223 may be utilized by the system 100 and methods to reorder the packets in the order in which they were initially received by the system 100. Also, as packets are moved from the first cache 130, 132 to the second cache 150, packets are moved from the second cache 150 to the third cache 170, or a combination thereof, the system 100 may transmit one or more notifications to the reorder queue 220-223 indicating that an eviction delay for evicting packets from the reorder queue 220-223 and that a service time for servicing the packets will increase. As a result, an agency or person requesting the packets that match the identifier will be notified of delivery latencies based on the location of the packets in the cache hierarchy.

Referring to the drawings and in particular to FIGS. 1-11, the system 100 may provide hierarchical caching for lossless network packet capture applications. The system 100 may be configured to support, but is not limited to supporting, content delivery services, cloud computing services, voice-over-internet protocol services (VoIP), software as a service (SaaS) applications, law enforcement services, gaming applications and services, productivity applications and services, mobile applications and services, and any other computing applications and services. Additionally, the system 100 may include one or more users that may utilize user device 102 to engage in communications, such as, but not limited to, phone communications, data communications, messaging communications, video communications, or a combination thereof, with destination device 175. The users may also utilize the user device 102 to request content, data, information, services, applications from the destination device 175. In certain embodiments, the user device 102 and the destination device 175 may be computers, servers, mobile devices, smartphones, computer tablets, phablets, or any other computing devices. In one embodiment, the user device 102 may include a memory 103 that includes instructions, and a processor 104 that executes the instructions from the memory 103 to perform various operations that are performed by the user device 102. The processor 104 may be hardware, software, or a combination thereof. Similarly, the destination device 175 may include a memory 176 that includes instructions, and a processor 177 that executes the instructions from the memory 176 to perform various operations that are performed by the destination device 175. The processor 177 may be hardware, software, or a combination thereof.

The user device 102 of the system 100 may connect with communications network 105 or another similar network. In certain embodiments, the communications network 105 may include and be connected to a mobile network, a wireless network, an ethernet network, a satellite network, a broadband network, a cellular network, any type of private network, a cable network, the Internet, an internet protocol network, a multiprotocol label switching (MPLS) network, a content distribution network, or any combination thereof. In other embodiments, the communications network 105 may be a private network, such as a virtual private network, utilized to connect each of the devices connected to the communications network 105 to one another in a secure fashion. The communications network 105 may employ any number of virtual private network protocols, such as, but not limited to, Internet Protocol Security (IPsec), Transport Layer Security (SSL/TLS), Secure Shell (SSH), or any other type of virtual private network protocol. The server 120, the level one caches 130 and 132, the level two cache 150, the level three cache 170, and the routers 110, 111, 112, and 113 may reside within or be connected to the communications network 105. The routers 110-113 may be intermediary devices on communication paths between the user device 102 and destination device 175. In further embodiments, the communications network 105 may be part of a single autonomous system that is located in a particular geographic region, or be part of multiple autonomous systems that span several geographic regions.

A user in the system 100 may utilize the user device 102 to transmit a request to access a resource that is provided by destination device 175, transmit a resource to the destination device 175, transmit a request to communicate with the destination device 175, transmit a request to establish a connection with the destination device 175, or a combination thereof.

In certain embodiments, the request may be a hypertext transfer protocol (HTTP) request, a request to initiate a VoIP session, a request to establish a text messaging session, a request to engage in a video session, a request to engage in a phone call, a request for data, or any other type of request. Additionally, in certain embodiments, the resource may include, but is not limited to, a website, a software application, a file, audio content, video content, text content, image content, gaming content, any web content, any other type of content, and any combination thereof. In certain embodiments, the request to access the resource may be sent via an internet web browser installed on or accessible by the user device 102.

Based on a request from the user device 102 or by the destination device 175, the user device 102 may be connected to the destination device 175, such as via communications network 105, the routers 110-113, or a combination thereof. A law enforcement agency or other similar agency may have a warrant, order, or directive issued to lawfully intercept communications between the user device 102 and the destination device 175. The warrant, order, or directive may include criteria for intercepting the communications. For example, the warrant may specify identifiers, such as, but not limited to, phone numbers, internet protocol addresses, communications addresses, names, keywords, email addresses, or any other type of identifiers that are to be monitored by the system 100. In order to intercept the communications between the user device 102 and the destination device 175, the law enforcement agency may install network taps, optical splitters 115, or other similar devices on communications links in the communications network, on communications links between the routers 110-113, or any combination thereof. If there are any packets that contain or are associated with an identifier from the warrant, the packets may be designated to ultimately be sent to one or more reorder queues, such as reorder queues 220-223 for further processing, and then ultimately to the agency.

Once the user device 102 and the destination device 175 are connected and packets are being sent between them, the network taps, optical splitters 115, or a combination thereof, may copy the packets being sent between the user device 102 and the destination device 175. The network taps or optical splitters 115 may then forward the copied packets to the packet capture devices 125 and 127 of the server 120 for caching and processing. In certain embodiments, the packet capture devices 125 and 127 may be specialized layer 2 network packet capture cards that may be installed on the server 120, and may be configured to determine or detect if packets have been lost in the system 100. Once the packets are captured by the packet capture devices 125 and 127, the packet capture devices 125 and 127 may relay packets to corresponding first caches of the server 120, which may be level one cache 130 and level one cache 132 respectively. The server 120 may include a memory 121 that stores instructions and a processor 122 that executes the instructions from the memory 121 to perform any of the operations of the server 120. Additionally, level one cache 130 may be dedicated to packet capture device 125, and level one cache 132 may be dedicated to packet capture device 127. Additionally, the level one caches 130 and 132 may be configured to store the packets received from the packet capture devices 125 and 127, may have a selected storage capacity that may be fixed in size or variable in size, and may be configured to be dynamic random access memories (DRAM). The level one caches 130 and 132 may be seen in further detail in FIG. 4.

Figure 2:
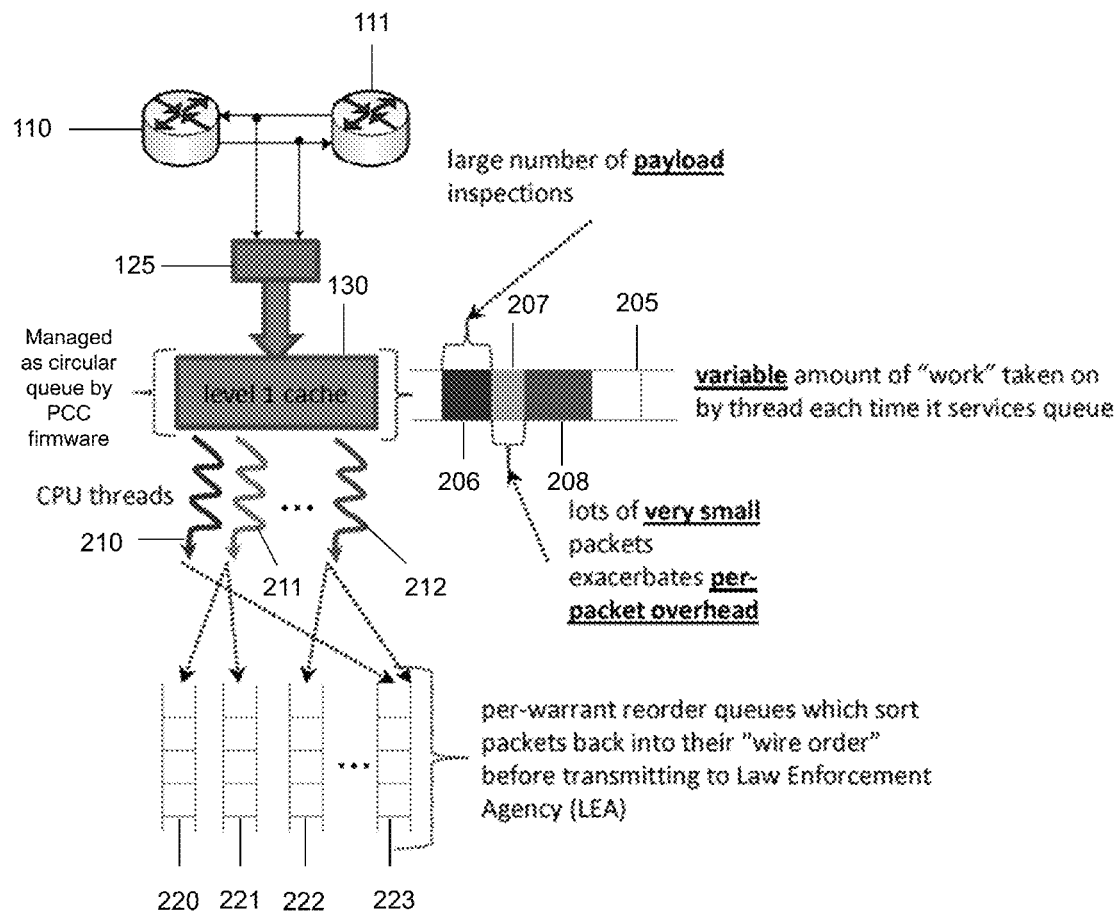
FIG. 2 is a schematic diagram illustrating the functionality of the level one cache of FIG. 1 and the processing of packets from the level one cache.

Packet capture device 125 may manage level one cache 130 as a queue, such as a circular queue 205 as shown in FIG. 2, which may be doubly mapped in a virtual memory space of the server 120. Similarly, packet capture device 127 may manage level one cache 132 as a queue, such as a circular queue, which may also be double mapped in a virtual memory space of the server 120. Additionally, the packet capture devices 125 and 127 may be configured to use direct memory access (DMA) to transfer captured packets into level one caches 130 and 132 respectively. Once the packets are received by the level one cache 130 and the level one cache 132, sets of the packets may be placed in certain blocks of queues corresponding to each of the level one caches 130 and 132. For example in FIG. 2, a first set of packets may be in block 206 of the circular queue 205, a second set of packets may be in block 207 of the circular queue 205, and a third set of packets may be in block 208 of the circular queue. In certain embodiments, the blocks 206, 207, and 208 may have varying amounts, sizes, and types of packets contained in each of the blocks 206, 207, and 208. Additionally, the blocks 206, 207, and 208 may be designated for packet payload inspections or not. For example, block 206 may include a set of packets that require a large number of packet payload inspections, block 207 may include a large set of very small packets, and block 208 may include a different set or type of packets from blocks 206 and 207.

Each of the blocks 206, 207, and 208 of the circular queue 205 may be assigned to a corresponding processor thread, such as processor threads 210-212, of the processor 122. The processor threads may be utilized to process the packets in each of the blocks 206, 207, and 208. For example, as shown in FIG. 2, processor thread 210 may be utilized to process the packets in block 206, processor thread 211 may be utilized to process the packets in block 207, and processor thread 212 may be utilized to process the packets in block 208 of the queue 205. If there are packets being processed in the processor threads 210, 211, and 212 that include an identifier as specified in the warrant, order, or directive, such packets may be transmitted to one or more reorder queues, such as reorder queues 220-223 for further processing. In certain embodiments, the processor threads 210, 211, and 212 may be configured to be processed in parallel and may be dedicated processor threads that may be utilized to share processor loads. Since each of the blocks 206, 207, and 208 may have different amounts or types of packets contained therein and may have different processing requirements, the processor 122 may complete the processing of the blocks 206, 207, and 208 in a different order than in which the blocks 206, 207, and 208 originally entered the queue 205. If this occurs, memory blocks may be unnecessarily held up in either the level one cache 130, the level one cache 132, or both.

As the packets are being processed by the processor in the processor threads 210-212, a condition may be detected by the system 100, which indicates that there may be potential for packet loss. For example, a condition indicating potential for packet loss may be a condition that indicates a that a stall condition may occur in the queue 205, a condition that indicates that a maximum service time threshold for processing packets in the processing threads 210-212 has been exceeded, a condition that indicates that greater than a threshold portion of the caches are unused, a condition that indicates that the packet capture device 125 or 127 determines that data may be lost, or any other condition that indicates that a packet may be lost.

Figure 5:
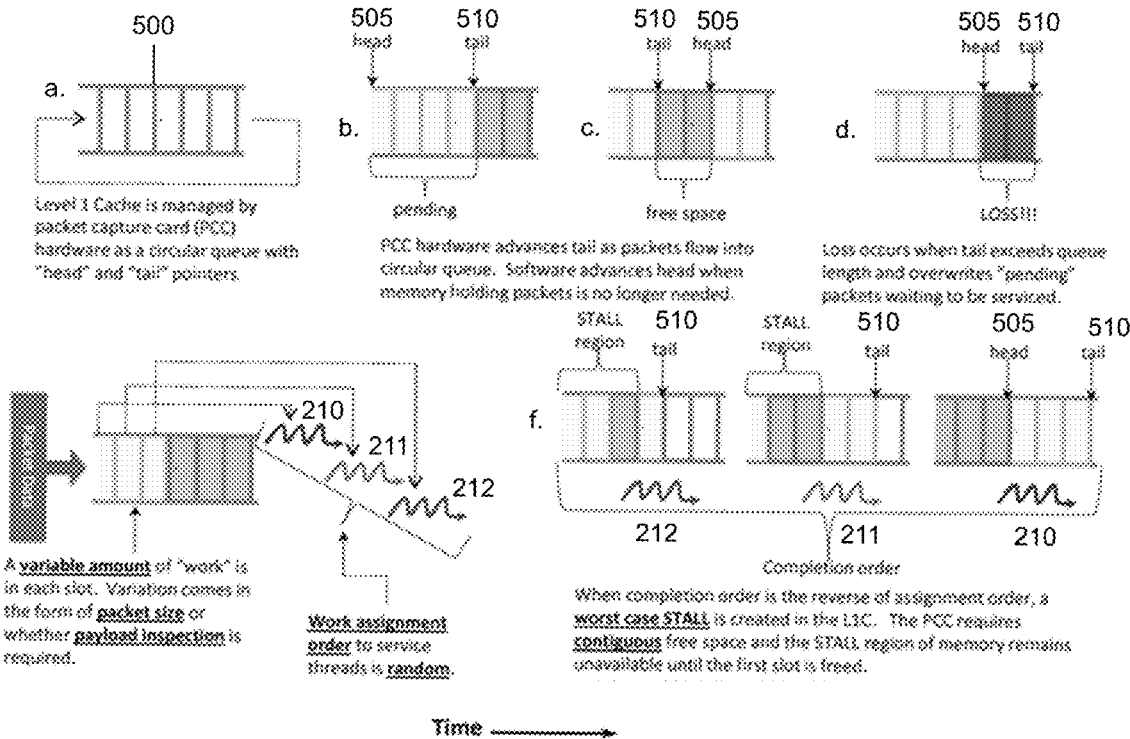
FIG. 5 is a schematic diagram illustrating a sample stall condition that may be prevented by the system of FIG. 1.

Referring now also to FIG. 5, a sample stall condition that may be prevented by the system 100 is shown. An empty circular queue 500, which may be similar to or the same as queue 205, is shown in section (a.) of FIG. 5. The queue 500 may include a head pointer 505 and a tail pointer 510, and may be managed by packet capture card 125 or 127. In section (b.) of FIG. 5, the head pointer 505 points at the first block in the queue 500, the tail pointer 510 points at the fourth block in the queue 500. Additionally, in section (b.), the first four slots of the queue 500 are filled with packets to be processed, and the last two slots are free. The packet capture card 125 or 127 may advance the tail pointer 510 as packets flow into the queue 500, and the head pointer 505 may be advanced when memory holding packets is no longer needed.

In section (c.) of FIG. 5, based on the processing of the packets in the slots, the tail pointer 510 may advance to the third slot, the head pointer 505 may shift to the fifth slot, and the middle two slots may have no pending packets to be processed. Section (d.) of FIG. 5 illustrates how packet loss would occur when the tail pointer 510 exceeds the length of the queue 500 and how pending packets waiting to be serviced in the queue 500 may be overwritten. In section (d.), the head pointer 505 is at the fifth slot and the tail pointer 510 is at the last slot of the queue 500. Section (f.) provides an example where work to be performed in the queue 500 may be assigned to processor threads at random. In this case, the processor thread 210 may be assigned first to process the packets in the first slot, the processor thread 211 may be assigned second to process the packets in the second slot, and the processor thread 212 may be assigned third to process the packets in the third slot. However, even though the processor threads 210-212 may be executed in parallel, the processor threads 210-212 may complete their processing in the reverse order in which they were assigned. For example, as shown in section (f.), processor thread 212 finished processing its packets first, processer thread 211 finishing processing its packets second, and processor thread 210 finished processing its packets third. In this case, a worse case stall condition may be created in the level one cache 130, level one cache 132, or both. This may result because the packet capture device 125 or 127 may require continuous free space and the stall region of memory may remain unavailable until the first slot is freed.

Figure 6:
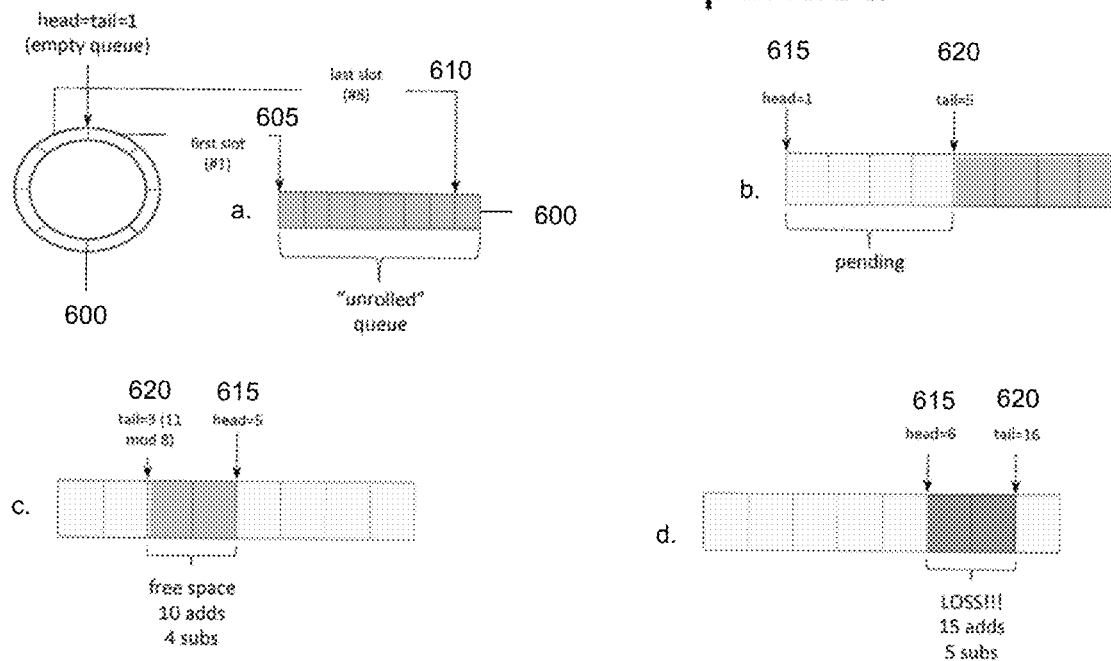
FIG. 6 is a schematic diagram further illustrating the sample stall condition of FIG. 5.

As shown in section (a.) of FIG. 6, a queue 600, which may be the same or similar in structure to queues 205 and 500, is shown rolled and unrolled, and is also shown as empty. The first slot 605 and the last slot 610 are illustratively shown in the queue 600. In section (b.) of FIG. 6, the first four slots are filled with packets pending to be processed, and the last four slots are empty. In this case, the head pointer 615 may be at the first slot, and the tail pointer 620 may be at the fifth slot. Section (c.) illustrates a scenario where ten sets of packets were added to the queue 600 and four sets of packets were processed and evicted from the queue 600. In this scenario, the tail pointer 620 has advanced to the third slot, the head pointer 615 has moved to the fifth slot, and there is unused memory in the third and second slots. However, in scenario (d.), there are fifteen sets of packets that were added to the queue 600 and only five sets of packets were processed and evicted from the queue 600. Since the queue length in this example is only eight, a loss may occur because some of the memory blocks may be overwritten before they are processed. For example, in this case, the memory region between the head pointer 615 and tail pointer 620 may be a region where packet loss occurs due to overwriting. The system 100 would prevent such a loss from occurring by transferring packets in the blocks to another cache before they could be overwritten.

Figure 7:
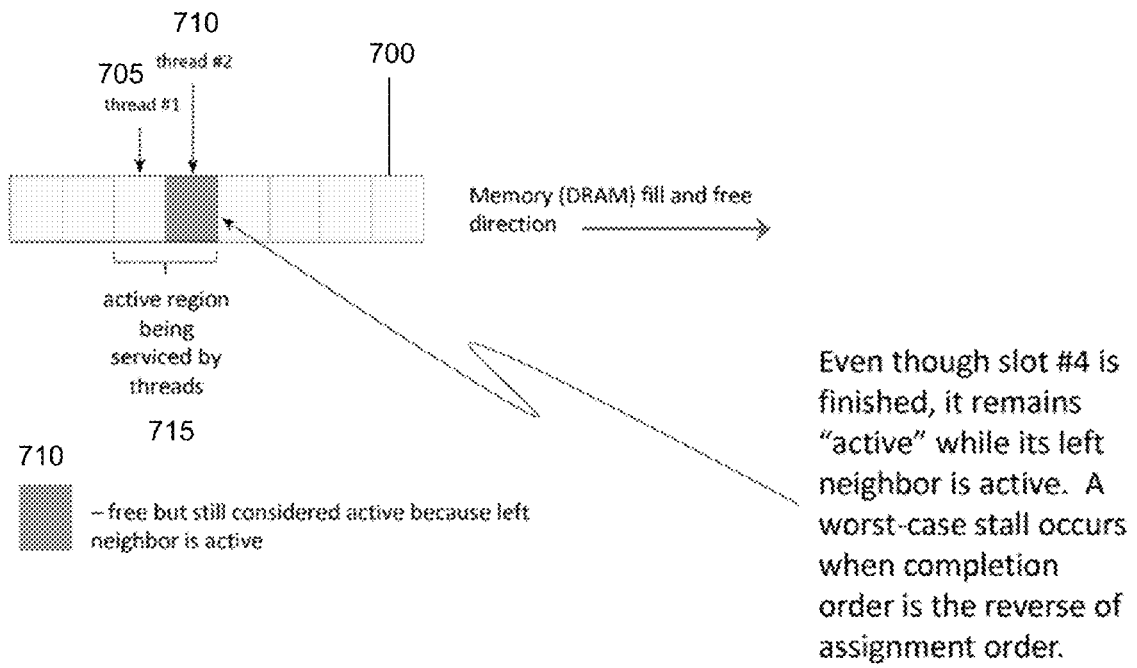
FIG. 7 is a schematic diagram illustrating a condition where a portion of a queue managed by the packet capture device of FIG. 1 remains active even when a processing thread is finished processing the portion.

In FIG. 7, a further explanation of a stall condition is illustrated. The queue 700 may be similar to or the same in structure as queues 205, 500, and 600. In this case, an active region 715 being serviced by processor threads is shown. The third slot 705 is still in the process of being processed, however, the fourth slot 710 has already completed. In this scenario, even though the fourth slot 710 is finished, the fourth slot 710 may remain active while its neighbor, the third slot 705, is active. A worst-case stall condition may occur when the completion of the processing of the slots is done in the reverse order in which the slots were assigned.

Figure 8:
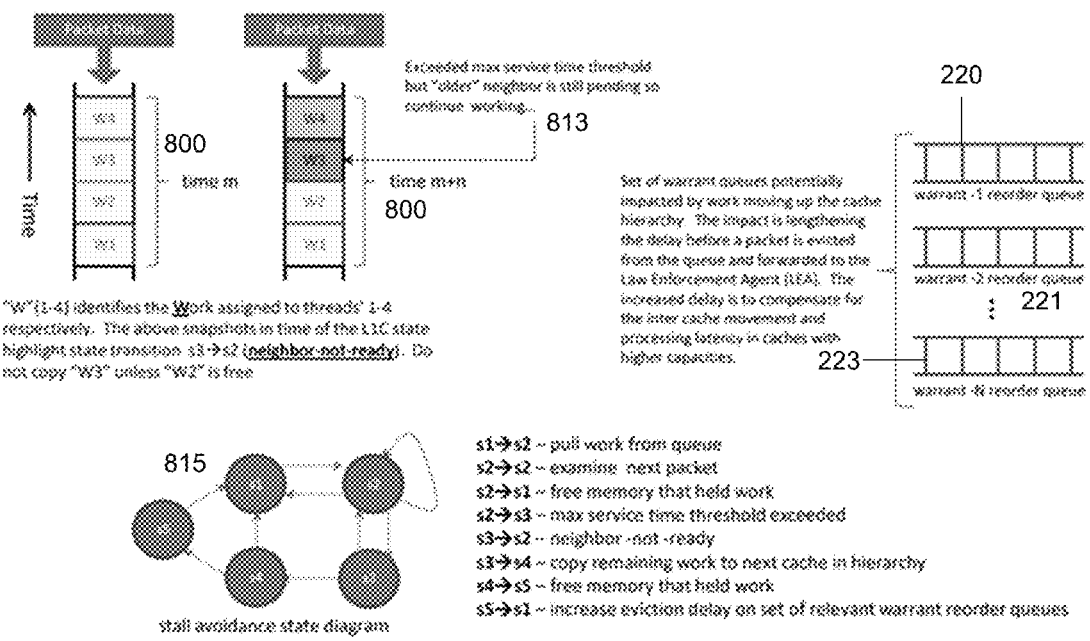
FIG. 8 is a schematic diagram illustrating a stall condition, a stall avoidance state diagram, and a set of reorder queues.

FIG. 8 illustrates an example stall condition, a stall avoidance state diagram, and a set of reorder queues 220-223. The queue 800 may be similar to or the same in structure as queues 205, 500, 600, and 700. W1-W4 in the slots of the queue 800 may be utilized to identify work, such as packets to be processed, that are assigned to a set of four processor threads. As time progresses, the thread servicing W3 may have exceeded a maximum service time threshold, however, its older neighbor, W2, may be still pending. In this scenario, because W3's neighbor is not ready yet, the thread servicing W3 may continue to process the packets for W3. Once W2 has completed processing and if W3 has exceeded the maximum service time threshold, then W3 may be copied in to the level two cache 150. State diagram 815 further illustrates this concept. From state one (s1) to state two (s2), work may be pulled from the queue 800. From (s2) to (s2), each next packet may be examined, and from (s2) to (s1) memory may be freed that held work that has been processed. S2 to state three (s3) may indicate that a maximum service time threshold has been exceeded for processing a particular set of packets handled by a thread. S3 to s2 may serve as an indication that a neighboring slot in the queue is not ready, which may indicate that the packets in the slot next to the neighboring slot should not be copied. S3 to state four (s4) may be utilized to indicate that work that is unprocessed should be copied into the next cache in the hierarchy. S4 to state five (s5) may be utilized to indicate that memory should be free that held work that has been processed. Finally, s5 to s1 may be utilized to indicate that an eviction delay on a set of reorder queues, such as reorder queues 220-2203 should be increased. FIG. 8 also illustrates that as work moves up the cache hierarchy, an impact of moving up the cache hierarchy is the lengthening of the delay before a packet is evicted from a queue and forwarded to an intended recipient, such as a law enforcement agency. The increased delay may be utilized to compensate for inter-cache movement and for processing latency in caches with higher capacities.

Figure 9:
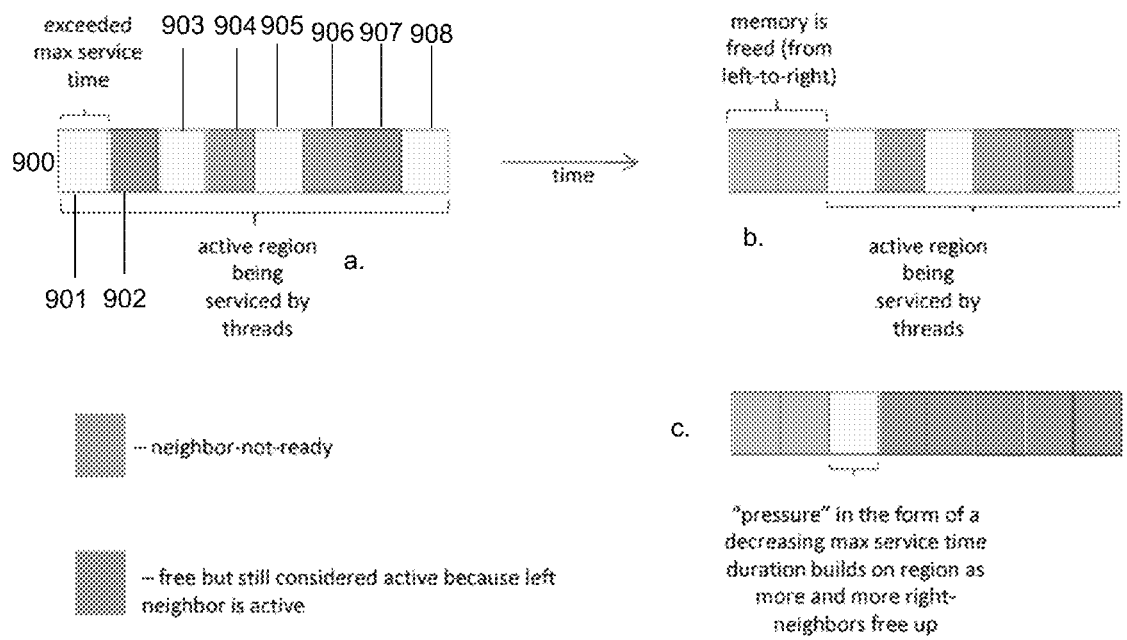
FIG. 9 is a schematic diagram illustrating how stall conditions may be avoided using the system of FIG. 1.
Figure 10:
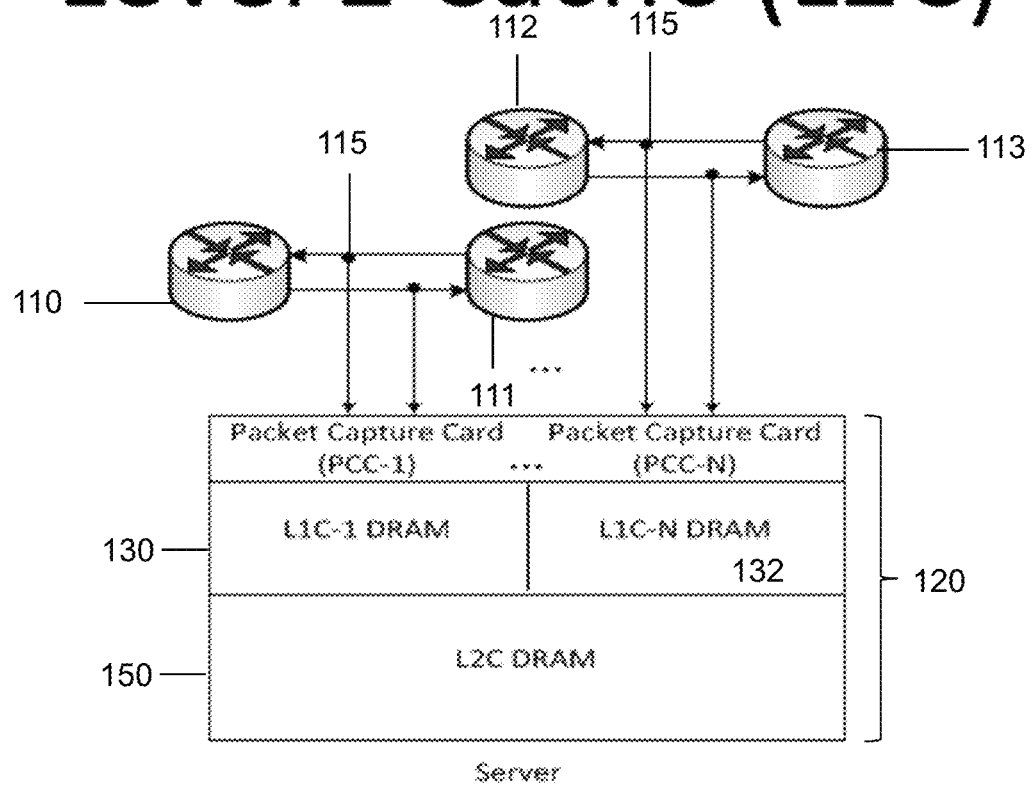
FIG. 10 is a schematic diagram illustrating the level two cache of the system of FIG. 1 in further detail.
Figure 11:
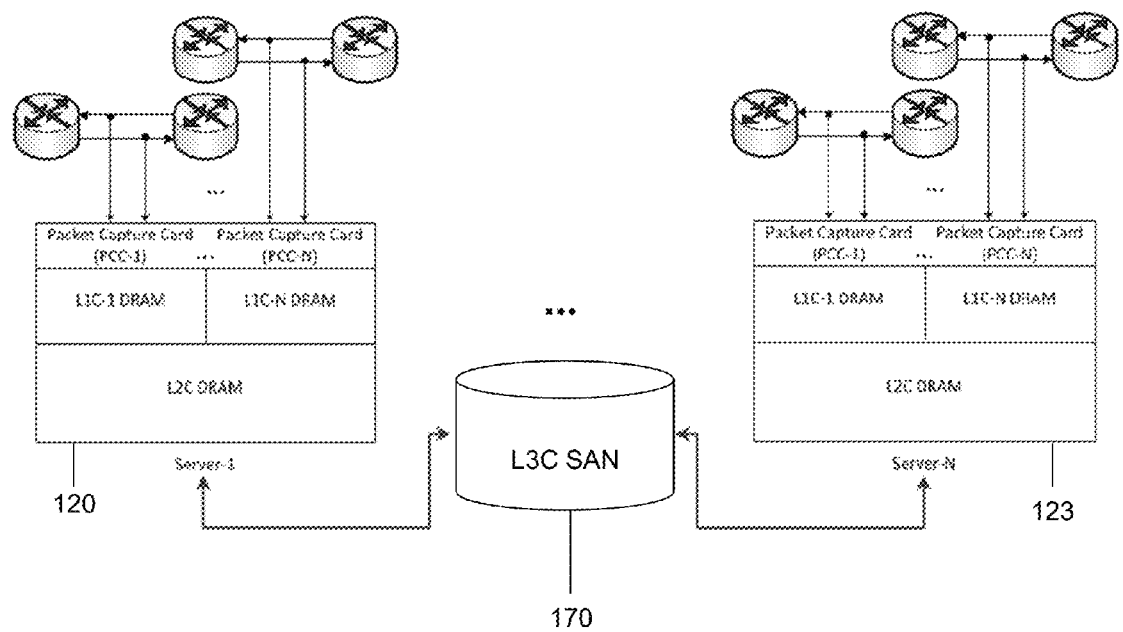
FIG. 11 is a schematic diagram illustrating the level three cache of the system of FIG. 1 in further detail.

FIG. 9 illustrates yet another stall condition that may be prevented by the system 100. Queue 900 may be similar to or have the same structure as queues 205, 500, 600, 700, and 800, and may include slots 901-908. In section (a.) of FIG. 9, the active region being serviced by processor threads may be the entire length of the queue 900, which in this case may be eight slots. Slot 901 may be pending, slot 902 may be free, but considered to be active because its neighboring slot is pending and active, slot 903 may be pending, slot 904 may be a neighbor-not-ready slot, slot 905 may be a pending slot, slot 906 may be another neighbor-not-ready slot, slot 907 may be free, but considered to be active because its neighboring slot is active, and slot 908 may be pending. As time progresses, section (b.) may illustrate a new state of the queue 900. In section (b.) slots 901-902 have been freed, and the remaining slots are now considered to be the active region being serviced by the processor threads. As more time progresses, section (c.) may illustrate yet another state of the queue 900. In this state, the slots 901-902 may be free, slot 903 may be pending, and slots 904-908 may be free, but considered to still be active because slot 903 is pending. In section (c.), pressure in the form of a decreasing maximum service time duration may build on the active region as more and more neighbors of slot 903 free up. The system 100 may be utilized to prevent any of the aforementioned stall conditions by evicting packets to another cache in the cache hierarchy when a potential for packet loss is detected by the system 100.

Figure 3:
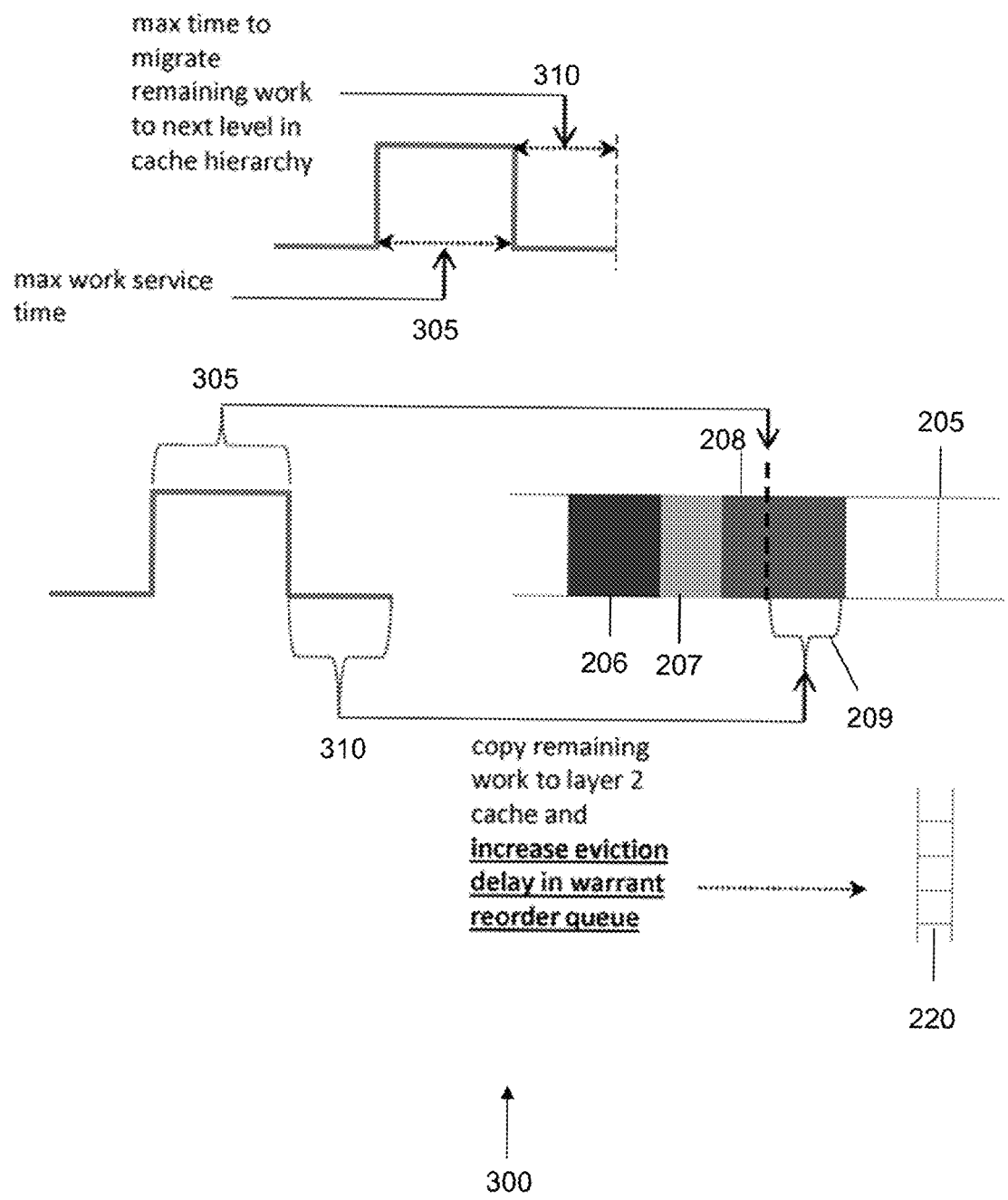
FIG. 3 is a schematic diagram illustrating what occurs in the system of FIG. 1 when a potential for packet loss occurs in the system.
Figure 4:
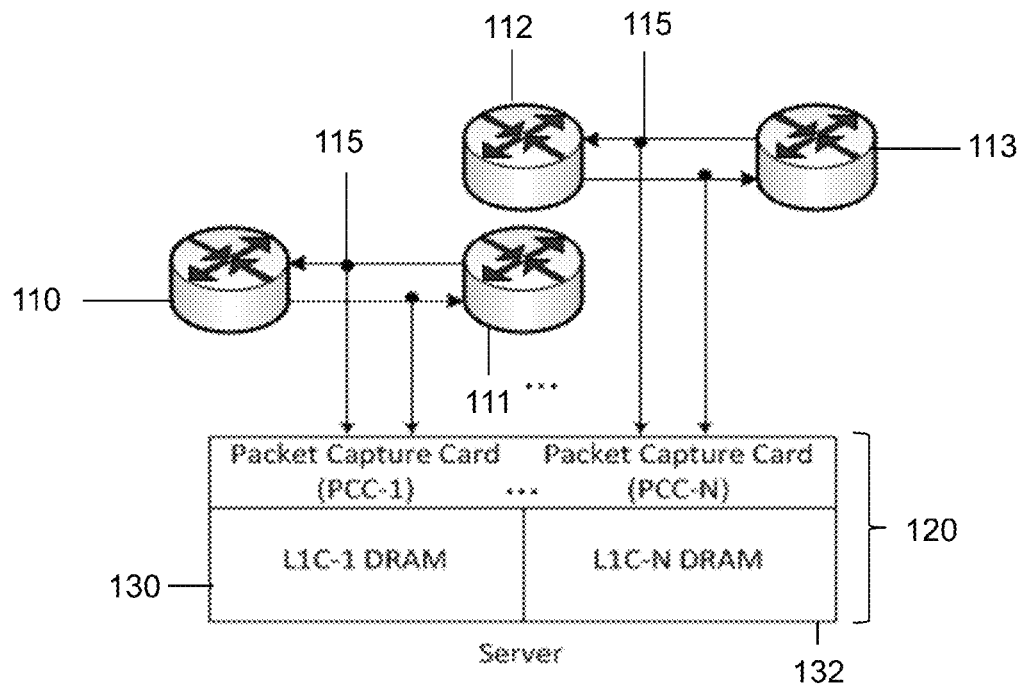
FIG. 4 is a schematic diagram illustrating the packet capture device and level one cache of the system of FIG. 1.

Referring now also to FIG. 3, a packet loss potential diagram 300 is schematically illustrated. When the processor 122 processes packets in the various processor threads 210-212, the processor 122 may have a maximum work service time, such as maximum work service time 305, in which to complete processing of packets in each of the blocks 206, 207, and 208. If the maximum service work time or other potential packet loss causing condition has been reached or exceeded, the processor 122 may copy a portion of the packets being processed from a first cache 130, 132, such as the level one caches 130 and 132, to a second cache 150, such as level two cache 150, so as to eliminate the possibility of packet loss. The portion of the packets that are copied may be packets that have not yet been processed by the processor 122. Additionally, the processor 122 may have a maximum time interval 310 to migrate the packets copied from the level one cache 130, the level one cache 132, or both, to the level two cache 150. For example, the unprocessed portion 209 of block 208 may be copied into the level two cache 150 within the maximum time interval 310.

The level two cache 150 may reside within the server 120, may have a selected storage capacity that may be fixed in size or variable in size, and may be configured to be DRAM. In certain embodiments, the level two cache 150 may have a greater capacity than the level one caches 130 and 132, however, in other embodiments, the level two cache 150 may be of any size. The level two cache 150 may be managed by software on the server 120 or otherwise, and may be shared by multiple packet capture devices, such as packet capture devices 125 and 127. By sharing the level two cache 150 with multiple packet capture devices, utilization of the DRAM may be improved, and may avoid drawbacks associated with the dedicated DRAM associated with the level one caches 130 and 132. Additionally, the level two cache 150 may be configured to have a near real-time service requirement, and packets processed from the level two cache 150 may be processed in non-dedicated threads and processes by the processor 122 within the server 120. The level two cache 150 may be seen in further detail in FIG. 10.

When packets are copied into the level two cache 150, the service time for processing the packets in the level two cache may increase by a predictable upper bound. Additionally, if there are packets that are copied that contain the identifier from the warrant, order, or directive, the processor 122 or another device of the system 100 may transmit a notification, such as to server 160, indicating that an eviction delay associated with evicting packets from the reorder queues 220-223 will increase by a predictable upper bound. Furthermore, latency information associated with delivering packets and data quality information may be provided based on the location of the packets in the cache hierarchy.

As packets are being processed from the level two cache 150, another condition may be detected by the system 100, which may indicate that there may be potential for packet loss from the level two cache 150. The conditions may be similar to those as discussed above. If such a condition is detected, then the processor 122 may copy a portion of unprocessed packets from the level two cache 150 into a third cache 170, such as level three cache 170, so as to prevent packet loss. Level three cache 170 may have a selected storage capacity that may be fixed in size or variable in size, and may be configured to be DRAM. In certain embodiments, the level three cache 170 may have a greater capacity than the level one caches 130 and 132 and the level two cache 150, however, in other embodiments, the level three cache 170 may be of any size. The level three cache 170 may be managed by software in the system 100, and may be utilized to pool resources across server boundaries, such as between server 120 and server 123. Additionally, the level three cache 170 may enable inter-server load sharing of packet capture through the use of Storage Area Network (SAN), and may utilize both DRAM and processing resources on an on-demand basis.

Based on the movement of the packets up the cache hierarchy, which consists of level one caches 130 and 132, level two cache 150 and level three cache 170, the system 100 may increase the corresponding service time for processing packets based on the capabilities for each of the caches. Additionally, for any packets in any of the caches that contain or are associated with identifiers that are in a warrant, order, or directive, the system 100 may generate notifications indicating that the eviction delay for evicting packets that are sent to the reorder queues 220-223 after being processed in the cache hierarchy should be increased. The reorder queues 220-223 may be utilized to reorder the packets received at the reorder queues 220-223 in an order that matches the order in which the packets were originally communicated between the user device 102 and the destination device 175. The order may be the wire order in which the packets were first transmitted between the user device 102 and the destination device 175. Based on the notifications, an intended recipient of the packets from the reorder queues 220-223 may know when to expect the packets from the reorder queues 220-223.

Additionally, the database 155 of the system 100 may be utilized to store and relay information that traverses the system 100, cache content that traverses the system 100, store data about each of the devices in the system 100, and perform any other typical functions of a database. In one embodiment, the database 155 may be connected to or reside within the communications network 105. Additionally, the database 155 may include a processor and memory or be connected to a processor and memory to perform the various operation associated with the database 155. The database 155 may store information relating to the requests traversing the system 100, store the packets captured by the system 100, store communications between the devices in the system 100, store eviction delay information for the reorder queues, store maximum services times for processing the packets, store latency information, store the warrants, or store any other information in the system 100. Furthermore, the database 155 may be configured to process queries sent to it by any device in the system 100.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. In one embodiment, the server 160 may be controlled by a law enforcement agency or other similar agency, and may be utilized to receive the packets from the reorder queues of the system 100. In another embodiment, the server 160 may be a mediation device. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, capturing the packets from the network taps or optical splitters 115, processing the packets in the processor threads, determining if a condition indicates that there is potential for packet loss, transmitting copies of packets to any of the caches, transmitting packets to reorder queues 220-223, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates specific example configurations of the various components of the system 100, the system 100 may include any configuration of the components, which may include using a greater or lesser number of the components. For example, the system 100 is illustratively shown as including a user device 102, a server 120, a server 160, a destination device 175, a database 155, a pair of level one caches 130 and 132, a level two cache 150, a level three cache 170, and a pair of packet capture devices 125 and 127. However, the system 100 may include any number of user devices 102, servers 120, servers 160, destination device 175, databases 155, level one caches 130 and 132, level two caches 150, level three caches 170, packet capture cards 125 and 127, or any number of any of the other components in the system 100. Furthermore, in one embodiment, substantial portions of the functionality and operations of the system 100 may be performed by other networks and systems that are connected to system 100.

Figure 12:
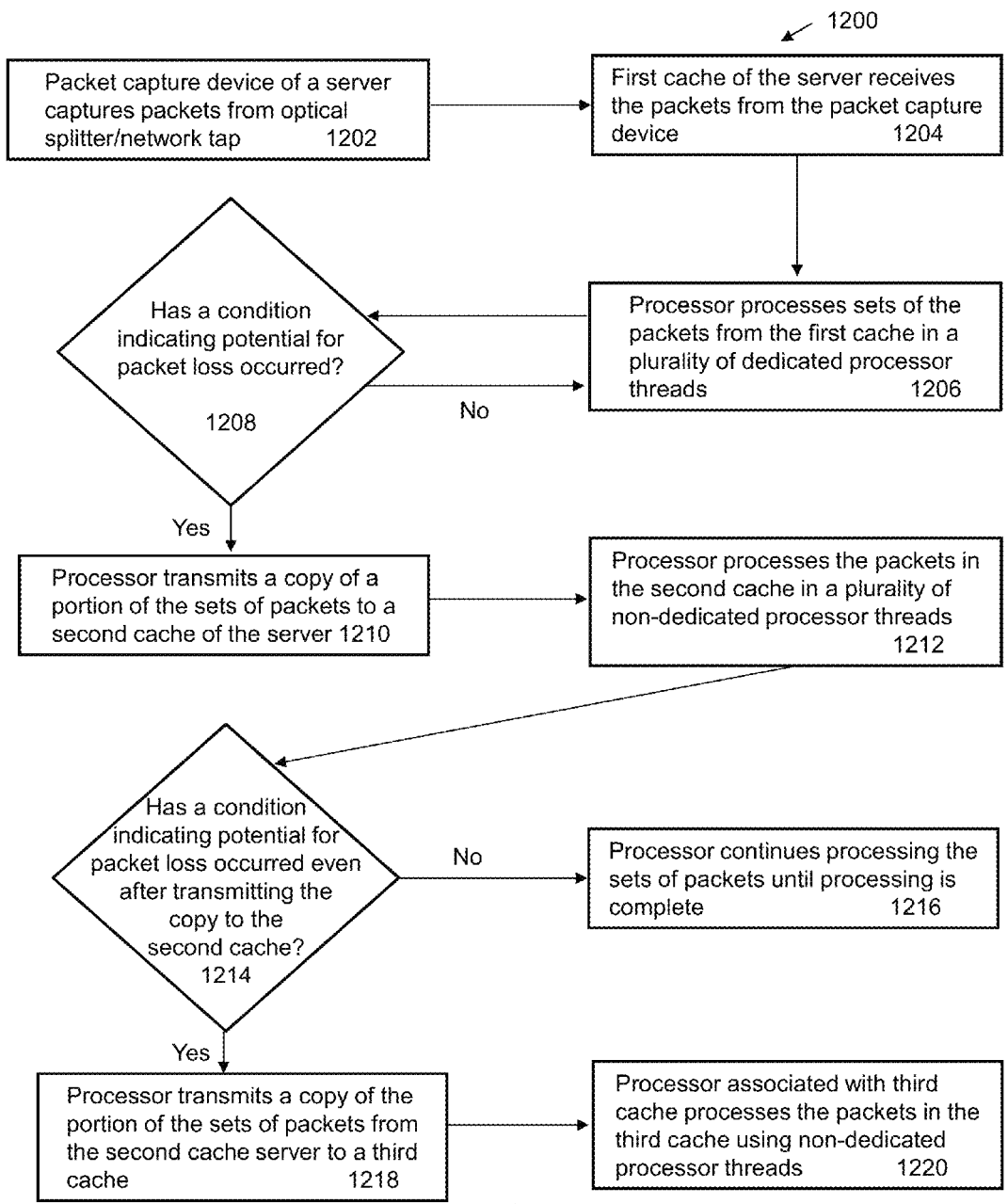
FIG. 12 is a flow diagram illustrating a sample method for providing hierarchical caching for lossless network packet capture applications according to an embodiment of the present disclosure.

As shown in FIG. 12, an exemplary method 1200 for providing hierarchical caching for lossless network packet capture applications is schematically illustrated, and may include, at step 1202, utilizing a packet capture device, such as packet capture devices 125 and 127 to capture packets from one or more optical splitters 115, network taps, or a combination thereof. In certain embodiments, the packets may be captured by the server 160 or any other appropriate device. At step 1204, the method 1200 may include having a first cache, such as level one caches 130 and 132, of a server 120 receive the captured packets from the packet capture device. Once the packets are received by the first cache, the packets may be managed in a queue by the packet capture device. At step 1206, the method 1200 may include having a processor 122 of the server 120 process the captured packets from the first cache in one or more processor threads. In one embodiment, the one or more processor threads may be dedicated processor threads, and a variable amount of work may be processed in each of the processor threads.

The method 1200 may include, at step 1208, determining if a condition indicating potential for packet loss has occurred. For example, a condition indicating potential for packet loss may be a condition that indicates a that a stall condition may occur in the queue, a condition that indicates that a maximum service time threshold for processing packets in the processing threads has been exceeded, or any other condition that indicates that a packet may be lost. In certain embodiments, the determination may be performed by the server 120, the server 160, or another appropriate device. If the condition indicating the potential for packet loss has not occurred, the method 1200 may include, continuing to process the sets of packets from the first cache 130, 132, as in step 1206. However, if the condition indicating the potential for packet loss has occurred, the method 1200 may include, at step 1210 having the processor 122 of the server 120 transmit a copy of a portion of the packets to a second cache 150 of the server 120, such as level two cache 150. In certain embodiments, the copy of the portion of the packets may be packets that have not been processed from the first cache 130, 132. In some embodiments, the second cache 150 may be configured to have a greater storage capacity than the first cache 130, 132, however, in other embodiments, the second cache 150 may have the same or less capacity than the first cache 130, 132.

At step 1212, the method 1200 may include having the processor 122 process the packets in the second cache 150 in one or more processor threads, which may be non-dedicated processor threads. The processor 122 may also continue to simultaneously process the packets from the first cache 130, 132 as well. At step 1214, the method 1200 may include determining if a condition indicating that potential packet loss has occurred even after transmitting the copy of the portion of the packets to the second cache 150. In one embodiment, the determination of the condition may be performed by the server 120, the server 160, or another appropriate device. If the condition indicating the potential for packet loss has not occurred, the method 1200 may include, at step 1216, having the processor 122 continue to process the sets of packets in the first and second caches 130, 132, 150. However, if the condition indicating the potential for packet loss has occurred, the method 1200 may include, at step 1218, having the processor 122 transmit a copy of a portion of the packets from the second cache 150 to a third cache 170. In certain embodiments, the copy of the portion of the packets from the second cache 150 may be packets that have not be processed. In certain embodiments, the third cache 170 may have a storage capacity that is greater than the second cache 150 and first cache 130, 132, however, in other embodiments, the third cache 170 may have the same or less capacity as the first and second cache 130, 132, 150. In one embodiment, the third cache 170 may be level three cache 170. At step 1220, the method 1200 may include having a processor associated with the third cache 170 process the packets in the third cache 170, such as by using non-dedicated processor threads.

The method 1200 may further include determining if there are any packets being processed that include an identifier that matches certain selected criteria, such as a phone number, name, internet protocol address or other identifier. The determination may be performed by the processor 122, the server 160, or by another appropriate device. Any packet containing the identifier may be transmitted according to the method 1200 to a reorder queue 220-223 for further processing. The transmission may be performed by the processor 122, the server 160, or by another appropriate device. The method 1200 may include having the reorder queue 220-223 reorder the packets into the order in which they were initially received by the system 100, packet capture device 125 or 127, or a combination thereof, and sending reordered packets to an intended recipient for use. Also, as packets are moved from the first cache 130, 132 to the second cache 150, packets are moved from the second cache 150 to the third cache 170, or a combination thereof, the method 1200 may include transmitting one or more notifications to the reorder queue 220-223 or to an intended recipient of the packets to indicate that an eviction delay for evicting packets from the reorder queue 220-223 and that a service time for servicing the packets will increase by a predictable upper bound. As a result, an agency or person requesting the packets that match the identifier may be notified of delivery latencies based on the position of the packets in the cache hierarchy. It is important to note that the methods described above may incorporate any of the functionality, devices, and/or features of the system 100 and subsystems described above, or otherwise, and are not intended to be limited to the description or examples provided herein.

Figure 13:
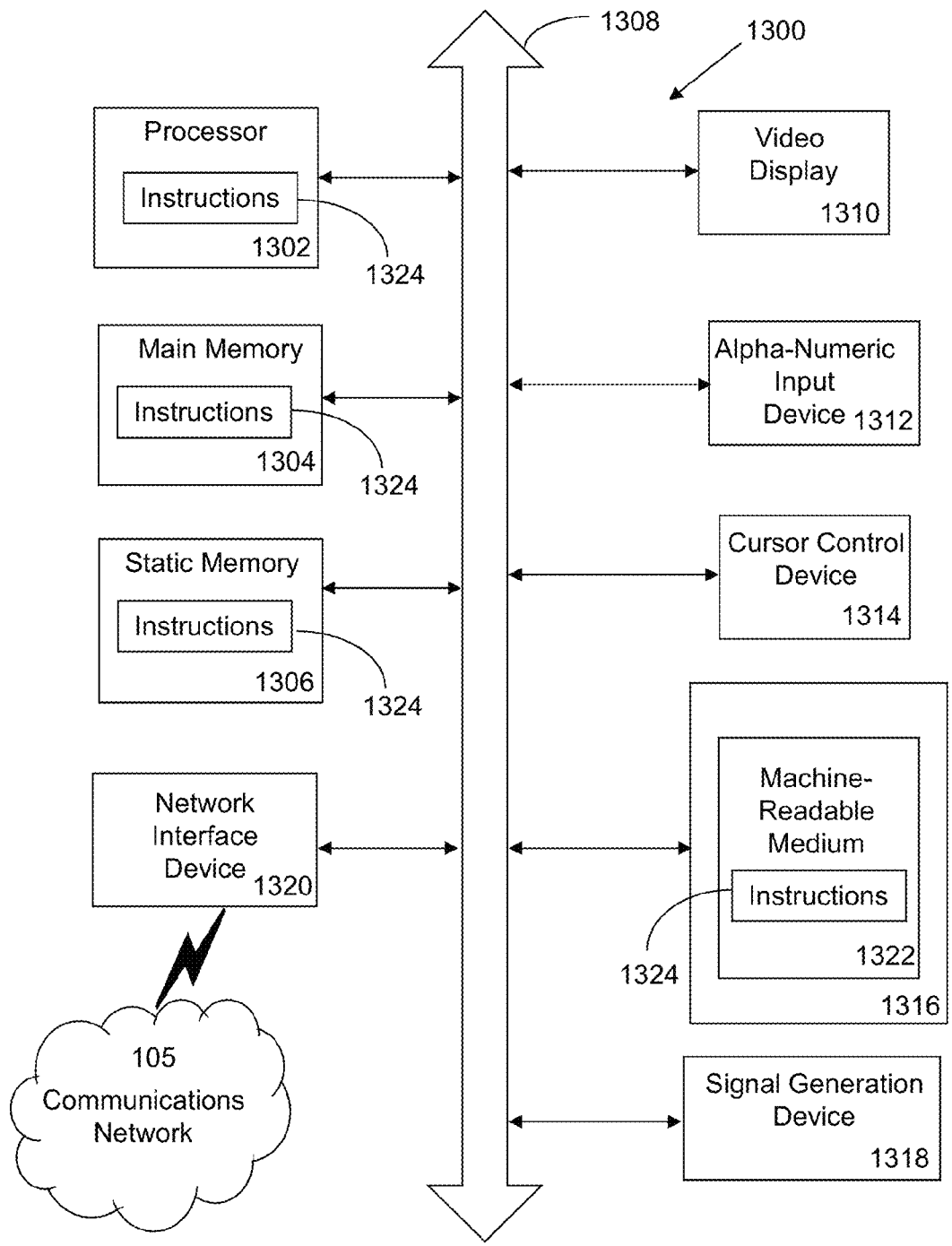
FIG. 13 is a schematic diagram of a machine in the form of a computer system within which a set of instructions, when executed, may cause the machine to perform any one or more of the methodologies or operations of the systems and methods for providing hierarchical caching for lossless network packet capture applications.

Referring now also to FIG. 13, at least a portion of the methodologies and techniques described with respect to the exemplary embodiments of the system 100 can incorporate a machine, such as, but not limited to, computer system 1300, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 105, another network, or a combination thereof) to and assist with operations performed by other machines, such as, but not limited to, user device 102, routers 110-113, optical splitters 115, server 120, packet capture devices 125 and 127, level one caches 130 and 132, level two cache 150, level three cache 170, server 160, destination device 175, database 155, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1300 may include a processor 1302 (e.g., a central processing unit (CPU), a graphics processing unit (GPU, or both), a main memory 1304 and a static memory 1306, which communicate with each other via a bus 1308. The computer system 1300 may further include a video display unit 1310, which may be, but is not limited to, a liquid crystal display (LCD), a flat panel, a solid state display, or a cathode ray tube (CRT). The computer system 1300 may include an input device 1312, such as, but not limited to, a keyboard, a cursor control device 1314, such as, but not limited to, a mouse, a disk drive unit 1316, a signal generation device 1318, such as, but not limited to, a speaker or remote control, and a network interface device 1320.

The disk drive unit 1316 may include a machine-readable medium 1322 on which is stored one or more sets of instructions 1324, such as, but not limited to, software embodying any one or more of the methodologies or functions described herein, including those methods illustrated above. The instructions 1324 may also reside, completely or at least partially, within the main memory 1304, the static memory 1306, or within the processor 1302, or a combination thereof, during execution thereof by the computer system 1300. The main memory 1304 and the processor 1302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium 1322 containing instructions 1324 so that a device connected to the communications network 105, other network, or a combination thereof, can send or receive voice, video or data, and to communicate over the communications network 105, other network, or a combination thereof, using the instructions. The instructions 1324 may further be transmitted or received over the communications network 105, other network, or a combination thereof, via the network interface device 1320.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The terms "machine-readable medium" or "machine-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium" or "machine-readable device" may be non-transitory. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system for providing lossless hierarchical caching comprising:
    a first server comprising:
        a packet capture device that captures a plurality of packets, wherein the plurality of packets are managed in a queue by the packet capture device;
        a first cache controlled by the packet capture device, wherein the plurality of packets are received from the packet capture device;
        a second cache; and
        a processor that executes instructions to perform operations, the operations comprising:
            processing, in a first processor thread, a first set of the plurality of packets in the first cache;
            determining if a first condition associated with processing the first set of the plurality of packets in the first cache indicates a potential for packet loss associated with the plurality of packets, wherein the first condition comprises a condition selected from the group consisting of a maximum work service time threshold being reached for the first processing thread, a detection of a stall condition in the queue, and a detection that greater than a threshold portion of the first cache is unused;
            transmitting, if the first condition indicates the potential for packet loss associated with the plurality of packets, a first copy of a portion of the first set of the plurality of packets to the second cache;
            processing, in a second processor thread, the first copy of the portion of the first set of the plurality of packets in the second cache; and
            transmitting a subset of packets from the first set of packets to a reorder queue if the subset of packets contain an identifier associated with the reorder queue, wherein the subset of packets are reordered in the reorder queue into order in which the subset of packets were initially received by the system.

2. The system of claim 1, wherein the operations further comprise determining if a second condition associated with processing the first copy of the portion of the first set of plurality of packets in the second cache indicates the potential for the packet loss associated with the plurality of packets.

3. The system of claim 2, wherein the operations further comprise transmitting, if the second condition indicates the potential for the packet loss associated with the plurality of packets, a second copy of a portion of the first copy to a third cache, wherein the third cache is shared by the first server and a second server.

4. The system of claim 1, wherein the operations further comprise increasing an eviction delay associated with the reorder queue when the first copy of the portion of the first set of the plurality of packets is transmitted to the second cache.

5. The system of claim 1, wherein the operations further comprise transmitting the first copy of the portion of the first set of the plurality of packets to the second cache within a maximum time threshold.

6. The system of claim 1, wherein the first copy of the portion of the first set of the plurality of packets that is transmitted to the second cache comprises unprocessed packets.

7. The system of claim 1, wherein the operations further comprise transmitting the first copy of the portion of the first set of the plurality of packets to the second cache only when an older neighboring processor thread has completed processing a second set of packets of the plurality of packets.

8. The system of claim 1, wherein the first processor thread is a dedicated processor thread and the second processor thread is a non-dedicated processor thread.

9. A method for providing lossless hierarchical caching, the method comprising:
    processing in a first processor thread of a processor of a first server a first set of a plurality of packets in a first cache, wherein the plurality of packets are managed in a queue controlled by a packet capture device;
    determining if a first condition associated with processing the first set of the plurality of packets in the first cache indicates a potential for packet loss associated with the plurality of packets, wherein the first condition comprises a condition selected from the group consisting of a maximum work service time threshold being reached for the first processing thread, a detection of a stall condition in the queue, and a detection that greater than a threshold portion of the first cache is unused;
    transmitting, if the first condition indicates the potential for packet loss associated with the plurality of packets, a first copy of a portion of the first set of the plurality of packets to a second cache;
    processing, in a second processor thread of the processor of the first server, the first copy of the portion of the first set of the plurality of packets in the second cache; and
    transmitting a subset of packets from the first set of packets to a reorder queue if the subset of packets contain an identifier associated with the reorder queue, wherein the subset of packets are reordered in the reorder queue to conform to an order in which the subset of packets were initially received.

10. The method of claim 9, further comprising determining if a second condition associated with processing the first copy of the portion of the first set of plurality of packets in the second cache indicates the potential for the packet loss associated with the plurality of packets.

11. The method of claim 10, further comprising transmitting, if the second condition indicates the potential for the packet loss associated with the plurality of packets, a second copy of a portion of the first copy to a third cache, wherein the third cache is shared by the first server and a second server.

12. The method of claim 9, further comprising increasing an eviction delay associated with the reorder queue when the first copy of the portion of the first set of the plurality of packets is transmitted to the second cache.

13. The method of claim 9, wherein the operations further comprise transmitting the first copy of the portion of the first set of the plurality of packets to the second cache within a maximum time threshold.

14. The method of claim 9, wherein the first copy of the portion of the first set of the plurality of packets that is transmitted to the second cache comprises unprocessed packets.

15. The method of claim 9, further comprising transmitting the first copy of the portion of the first set of the plurality of packets to the second cache when only when an older neighboring processor thread has completed processing a second set of packets of the plurality of packets.

16. The method of claim 9, wherein the subset of packets from the first set of packets in the reorder queue are transmitted out of the reorder queue when the subset of packets are reordered to conform to the order in which the subset of packets were initially received.

17. A computer-readable device comprising instructions, which when loaded and executed by a processor of a first server, cause the processor to perform operations, the operations comprising:

processing, in a first processor thread of the processor of the first server, a first set of a plurality of packets in a first cache, wherein the plurality of packets are managed in a queue controlled by a packet capture device;

determining if a first condition associated with processing the first set of the plurality of packets in the first cache indicates a potential for packet loss associated with the plurality of packets, wherein the first condition comprises a condition selected from the group consisting of a maximum work service time threshold being reached for the first processing thread, a detection of a stall condition in the queue, and a detection that greater than a threshold portion of the first cache is unused;

transmitting, if the first condition indicates the potential for packet loss associated with the plurality of packets, a first copy of a portion of the first set of the plurality of packets to a second cache;

processing, in a second processor thread of the processor of the first server, the first copy of the portion of the first set of the plurality of packets in the second cache; and transmitting a subset of packets from the first set of packets to a reorder queue if the subset of packets contain an identifier associated with the reorder queue, wherein the subset of packets are reordered in the reorder queue to conform to an order in which the subset of packets were initially received.

18. The computer-readable device of claim 17, wherein the operations further comprise determining if a second condition associated with processing the first copy of the portion of the first set of plurality of packets in the second cache indicates the potential for the packet loss associated with the plurality of packets.

19. The computer-readable device of claim 17, wherein the operations further comprise transmitting the first copy of the portion of the first set of the plurality of packets to the second cache within a maximum time threshold.

20. The computer-readable device of claim 17, wherein the operations further comprise increasing an eviction delay associated with the reorder queue when the first copy of the portion of the first set of the plurality of packets is transmitted to the second cache.

* * * * *